(12) United States Patent
Schütz et al.

(10) Patent No.: US 7,114,745 B2
(45) Date of Patent: Oct. 3, 2006

(54) MONITORING SYSTEM FOR DETENT CONNECTIONS

(75) Inventors: Dominik Schütz, Waldaschaff (DE); Ralf Scherer, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 261 days.

(21) Appl. No.: 10/731,671

(22) Filed: Dec. 9, 2003

(65) Prior Publication Data

US 2004/0119582 A1 Jun. 24, 2004

(30) Foreign Application Priority Data

Dec. 10, 2002 (DE) ........................... 202 19 124 U

(51) Int. Cl.
*B60R 21/16* (2006.01)
(52) U.S. Cl. ..................................... 280/731
(58) Field of Classification Search ............... 280/731; 200/61.54, 61.55
See application file for complete search history.

(56) References Cited

U.S. PATENT DOCUMENTS

| | | | |
|---|---|---|---|
| 4,974,873 A | 12/1990 | Kaiguchi et al. | |
| 5,165,717 A | 11/1992 | Tanaka | |
| 5,257,816 A | 11/1993 | Sugimoto et al. | |
| 6,675,675 B1* | 1/2004 | Sauer et al. | 74/552 |
| 2002/0171229 A1 | 11/2002 | Mattes | |
| 2005/0161308 A1* | 7/2005 | Frisch | 200/61.54 |

FOREIGN PATENT DOCUMENTS

| | | |
|---|---|---|
| EP | 0563943 | 10/1993 |
| GB | 23333744 | 8/1999 |

\* cited by examiner

*Primary Examiner*—Faye M. Fleming
(74) *Attorney, Agent, or Firm*—Tarolli, Sundheim, Covell & Tummino LLP

(57) ABSTRACT

A monitoring system in a motor vehicle, for detecting an incorrectly locked detent connection between a gas bag module and a vehicle-fixed component, includes first and second detent elements complementary to each other. A signal circuit is provided, having first and second contact elements which are part of a switch arranged in the signal circuit, a monitoring signal being generated when the switch is closed. The contact elements are in electrical contact with each other, with the switch being closed, only in an incorrectly locked state of the first and second detent elements only.

17 Claims, 4 Drawing Sheets

MONITORING SYSTEM FOR DETENT CONNECTIONS

TECHNICAL FIELD

The invention relates to a monitoring system in a motor vehicle.

BACKGROUND OF THE INVENTION

A monitoring system of the type in question serves to detect an incorrectly locked detent connection between a gas bag module and a vehicle-fixed component, including first and second detent elements which are complementary to each other.

During the installation of gas bag modules, to accelerate the installation process, detent connections are being used increasingly frequently to fasten the gas bag module to the steering wheel, for example. Here, it is essential that incorrectly locked detent connections are reliably detected and can be eliminated. Identifying an incorrectly locked detent connection is visually often possible with difficulty, because the two detent elements which are to be brought into engagement with each other are already in immediate proximity to each other.

BRIEF SUMMARY OF THE INVENTION

The invention provides a monitoring possibility for such detent connections which is able to be used both during the installation of the gas bag module and also during the further lifespan of the gas bag module.

This is achieved in a monitoring system in a motor vehicle, for detecting an incorrectly locked detent connection between a gas bag module and a vehicle-fixed component, which includes first and second detent elements that are complementary to each other. A signal circuit is provided, having first and second contact elements which are part of a switch arranged in the signal circuit, a monitoring signal being generated when the switch is closed. The contact elements are in electrical contact with each other, with the switch being closed, only in an incorrectly locked state of the first and second detent elements. In other words, the monitoring system is designed such that the contact elements only come into contact when the gas bag module is not inserted in the correct position into its mounting provided on the vehicle. This can happen, for example, when the two detent elements are tilted with respect to each other. As soon as the detent connection is correctly closed, the two contact elements are separated from each other, just as they are before the insertion of the gas bag module into the mounting. Using this monitoring system, it is possible to reliably verify, even for sites which are not able to be seen visually, whether the detent connection is correctly locked or not. The monitoring system can also be used on dismantling of the gas bag module for maintenance purposes or for an exchange of the gas bag module, without additional components on the vehicle having to be mounted or removed.

Preferably the monitoring signal is an acoustic signal, the signal circuit advantageously being part of a horn circuit, so that the horn signal can be used as acoustic signal.

In a preferred embodiment of the invention, the first detent element is a metal part fastened to the vehicle-fixed component or to the gas bag module, which metal part is partially surrounded by an electrical insulation. Through the insulation, the component can be easily kept at a potential different from zero, only the non-insulated site or sites being used for generating an electrical contact.

In this embodiment, the second detent element is formed by at least one detent hook which is fastened to the gas bag module or to the vehicle-fixed component. To form the detent connection, the two detent elements engage into each other in a known manner, the detent hooks of the second detent element being able to deflect the first detent element elastically by a short distance, in order to form the detent connection.

In this embodiment, the first contact element is formed by the first detent element. However, it is also possible to provide for the first contact element a component other than the first detent element, e.g. a metal sheet fastened to the gas bag module or to the vehicle-fixed component.

In this embodiment, the second contact element is a metal sheet fastened to the gas bag module or to the vehicle-fixed component.

Preferably the signal circuit is supplied by a battery of the vehicle.

In a second embodiment of the invention, a signal circuit is provided, having first and second contact elements which are part of a first switch arranged in the signal circuit, the signal circuit comprising a second switch which is open in a basic state and is connected in series with the first switch, the contact elements only being in electrical contact with each other in a correctly locked state of the detent elements, so that the first switch is closed and the signal circuit can be closed by closing the second switch. In this case, the incorrectly locked detent connection is not indicated by a signal, but rather by the failure of a signal, e.g. on actuation of the horn. The signal can only be triggered with a correctly locked detent connection, i.e. with the gas bag module correctly connected with the steering wheel or with another vehicle-fixed component.

In this second embodiment of the invention, the signal circuit is preferably part of a horn circuit, and the second switch is formed by the horn contacts. As a test for the correct installation of the gas bag module, the horn is accordingly actuated; if there sounds a signal, the gas bag module is correctly installed; if no horn signal sounds, the detent connection is not correctly locked.

All the other features already described with respect to the first embodiment can also be realized in this second embodiment.

DETAILED DESCRIPTION OF THE PREFERRED EMBODIMENTS

Figure 1:
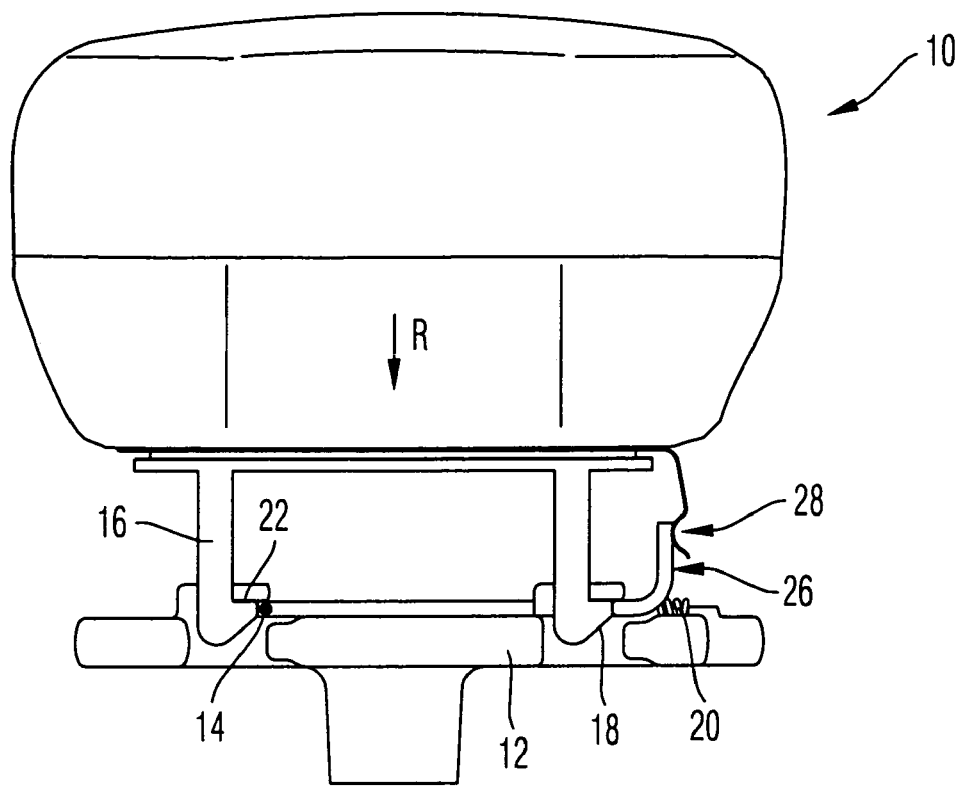
FIG. 1 shows a diagrammatic view of a steering wheel with a gas bag module and with a monitoring system according to a first embodiment of the invention in an incorrectly locked state.
Figure 2:
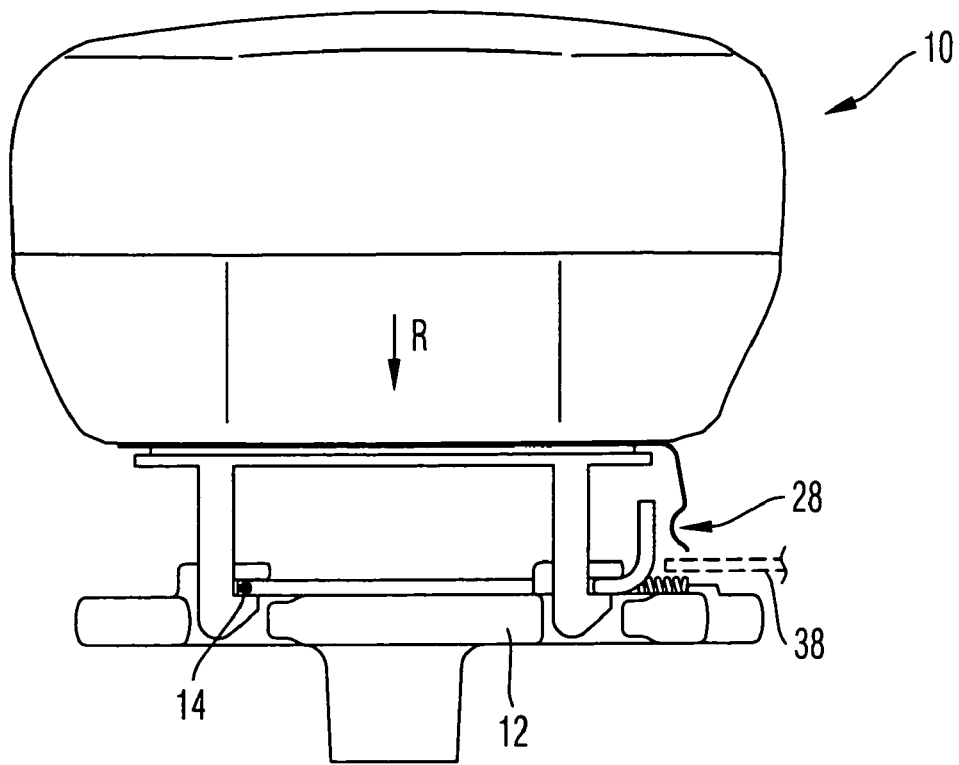
FIG. 2 shows the system of FIG. 1 in the correctly locked state.

FIGS. 1 and 2 show an assembly of a gas bag module 10 and of a steering wheel 12, the latter by way of example representing a vehicle-fixed component; only the skeleton of the hub region of the steering wheel 12 is illustrated in the figures, with a monitoring system for recognizing an incorrectly locked detent connection between the gas bag module and the steering wheel according to a first embodiment.

The detent connection is constructed between a first detent element 14, which in the embodiments shown here is arranged on the steering wheel 12, and several second detent elements 16, which are securely connected here with the gas bag module 10.

In the examples shown here, the first detent element 14 is a rigid metal wire or a metal plate, whereas the second detent elements 16 are detent hooks constructed in a known manner.

The detent connection between the detent elements 14, 16 is established by the insertion of the gas bag module 10 in insertion direction R. In so doing, the detent hooks with oblique sliding surfaces 18 constructed on the underside of the hooks press the first detent element 14 to the side, the first detent element being displaceably mounted perpendicular to the insertion direction R against a spring element 20, so that detent surfaces 22 of the detent hooks can move in insertion direction R past the first detent element 14. After the detent surfaces 22 have passed the first detent element 14, this is restored by the elastic force of the spring element 20, so that the detent surfaces 22 are in abutment against the first detent element 14, whereby the gas bag module 10 is fixed on the steering wheel 12. This desired correctly locked state is shown in FIG. 2.

Now, it can happen that despite the correct over-pressing of the detent elements 14, 16 against each other, e.g. by friction resistances or foreign bodies, the detent hooks do not reach their locking position but rather, as shown in FIG. 1, remain stuck in an incorrectly locked state. In the example shown in FIG. 1, the sliding surfaces 18 still lie against the first detent element 14; the detent surfaces 22 therefore have not moved past the first detent element 14 in direction R, and the first detent element 14 is still deflected from its basic position. Visually, the two states are only able to be distinguished from each other with difficulty.

To monitor the correct locking of the detent connection 14, 16, a signal circuit 24 is provided (see FIG. 5), which includes a first contact element 26 and also a second contact element 28, which are both part of a switch 30 arranged in the signal circuit 24.

Here, the first contact element 26 is constructed in one piece with the first detent element 14 in the form of a metal arm projecting therefrom against the insertion direction R. The second contact element 28 here is a bent metal sheet which is securely connected with the gas bag module 10 and which has a bent arm. The two arms of the contact elements 26, 28 are arranged such that they only touch each other in the incorrectly locked state of the detent connection 14, 16. In the correctly locked state, the first contact element 26 will move away from the second contact element 28 through the movement of the first detent element 14 into its basic position.

The electrical contact between the contact elements 26, 28 leads to the signal circuit 24 being closed, which in turn results in the triggering of a monitoring signal. The monitoring signal can be visual, but is preferably an acoustic signal. In the cases shown here, the signal circuit 24 is part of a horn circuit to supply a horn 32, so that a horn signal sounds as acoustic signal.

The supply of the signal circuit 24 and of the horn circuit takes place by means of the vehicle battery 34.

The gas bag module 10 is designed as a so-called floating horn module which is mounted movably in insertion direction R so that it can be moved by a certain distance for actuation of the horn. To actuate the horn 32, two electrical contacts are provided on the gas bag module 10 and on the steering wheel 12, which on touching close the horn circuit so that the horn signal sounds. These two contacts form a further, second switch 36. This actual horn switch 36 is open in its basic state and is only closed when the horn is actuated.

The second contact element 28 can fulfill at the same time the function of a horn contact. In FIG. 2, the second part of the switch 36 is indicated diagrammatically by a component 38 which is connected with the steering wheel 12.

Figure 5:
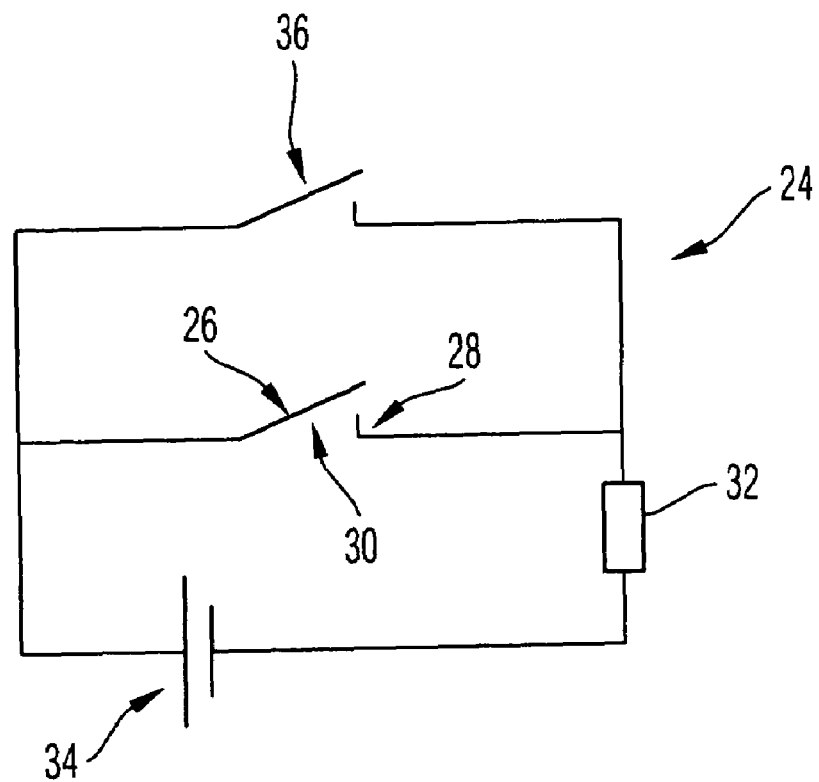
FIG. 5 shows a diagrammatic view of a signal circuit of the monitoring system according to the first embodiment.

When the gas bag module 10 is correctly inserted, the horn contact elements 28, 38 do not touch each other. Only when the gas bag module 10 is pressed downwards in insertion direction R, there is an electrical contact between the elements 28, 38. As can be seen in FIG. 5, the two switches 30, 36 are connected parallel to the horn 32. This means that a horn signal sounds either when the horn is actuated by pressing down the gas bag module 10, i.e. when the contacts 28, 38 come in contact with each other, or when the gas bag module 10 is not correctly locked on the steering wheel 12 and the contact elements 26, 28 touch each other.

If the battery 34 is connected, in any case a short horn signal must occur on insertion of the gas bag module 10 into the steering wheel 12 during locking. If the horn signal becomes silent at the end of the insertion process, this is a sign that the detent connection 14, 16 is correctly made.

In the first embodiment, the first contact element 26 is connected with the positive pole of the battery, whereas the second contact element 28 is at ground. This has the advantage that the second detent elements 16 do not have to be insulated against the skeleton of the steering wheel 12.

Equally as well, of course, the first detent element or the first contact element 26 connected therewith can be at ground and the second contact element 28 can assume a potential different from zero.

Figure 3:
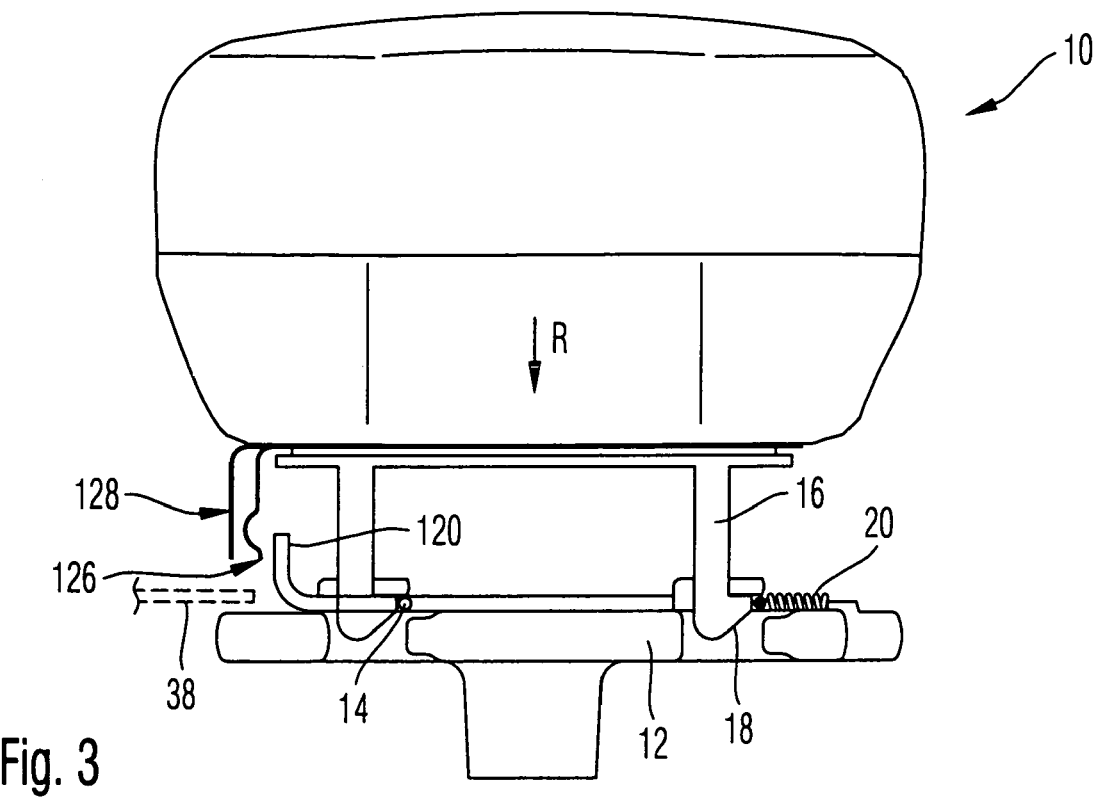
FIG. 3 shows an assembly of a steering wheel and of a gas bag module with a monitoring system according to the invention according to a second embodiment of the invention in an incorrectly locked state.
Figure 4:
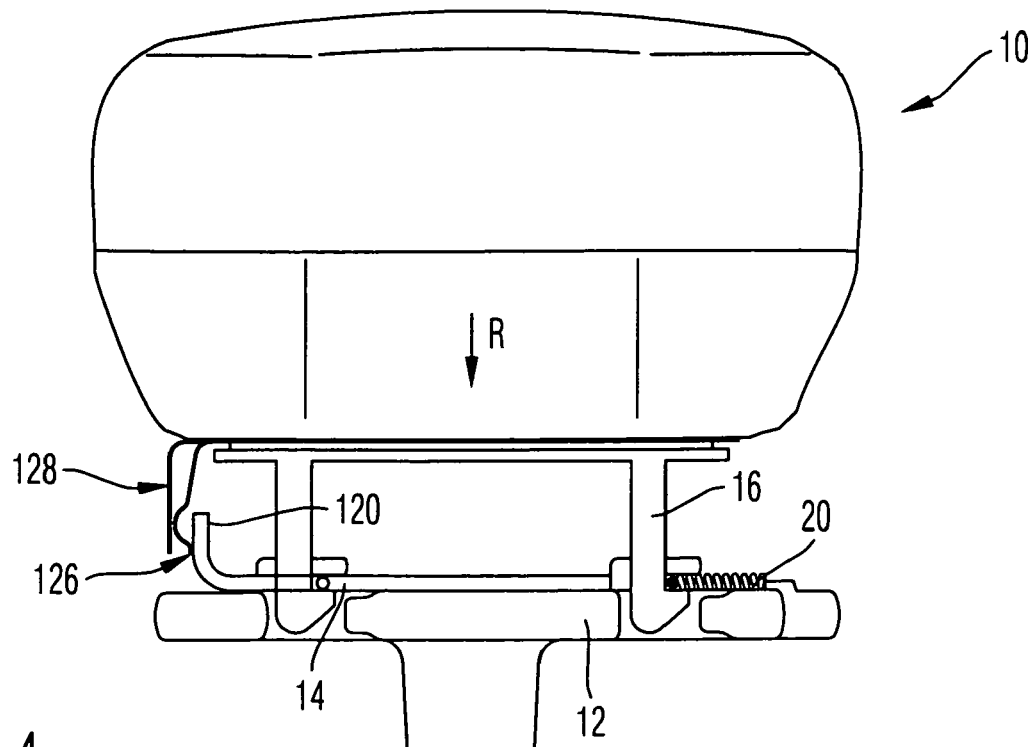
FIG. 4 shows the system of FIG. 3 in the correctly locked state.
Figure 6:
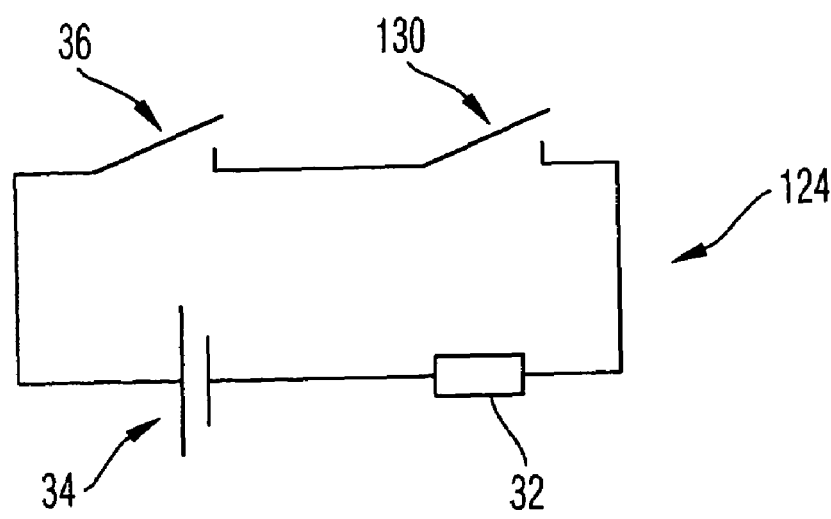
FIG. 6 shows a diagrammatic view of a signal circuit of the monitoring system according to the second embodiment.

In FIGS. 3, 4 and 6 a second embodiment of a monitoring system for the detent connection 14, 16 is illustrated.

In the second embodiment, in contrast to the first embodiment, the first contact element 126 is not constructed in one piece with the first detent element 14, but rather as a separate component therefrom. In the case shown here, it consists of a bent metal sheet which is fastened to the gas bag module 10. The second contact element 128, in a similar manner to the first embodiment, is a bent metal sheet which is likewise fastened to the gas bag module 10. The distance between the bent arms of the contact elements 126, 128 is selected such that in the non-deflected state of the first detent element 14, a section 120 of this detent element 14 lies against the first contact element 126 and deflects this so far that it touches the second contact element 128 and therefore an electrical contact exists between the contact elements 126, 128. This situation is illustrated in FIG. 4.

In the incorrectly locked state which is shown in FIG. 3, the first detent element 14 is deflected from its basic position, and namely away from the arms of the contact elements 126, 128, so that the arm 120 of the first detent element 14 does not touch the first contact element 126.

The signal circuit 124 is designed such that the switch 130, which is formed by the contact elements 126, 128, is connected in series with the horn switch 36. The horn switch 36 can be constructed as described in the first embodiment, or may be formed in another known way.

The switch 130 is only closed when the arm 120 presses the contact elements 126, 128 against each other, which is only the case when the detent connection 14, 16 is correctly locked. In this case, no horn signal sounds with an incorrectly locked detent connection 14, 16, but rather the faulty detent connection is identified in that on actuation of the horn, the latter will not deliver a horn signal owing to the opened switch 130. When the gas bag module 10 is correctly installed, on the other hand, the horn signal sounds on actuation of the horn.

Also in the second embodiment, preferably the first contact element 126 is connected to ground, whereas the second contact element 128 is connected to the positive pole of the battery 34. This of course means that the contact elements 126, 128 are insulated electrically with respect to each other.

It is likewise possible to reverse the polarities and to connect the second contact element 128 to ground.

Figure 7:
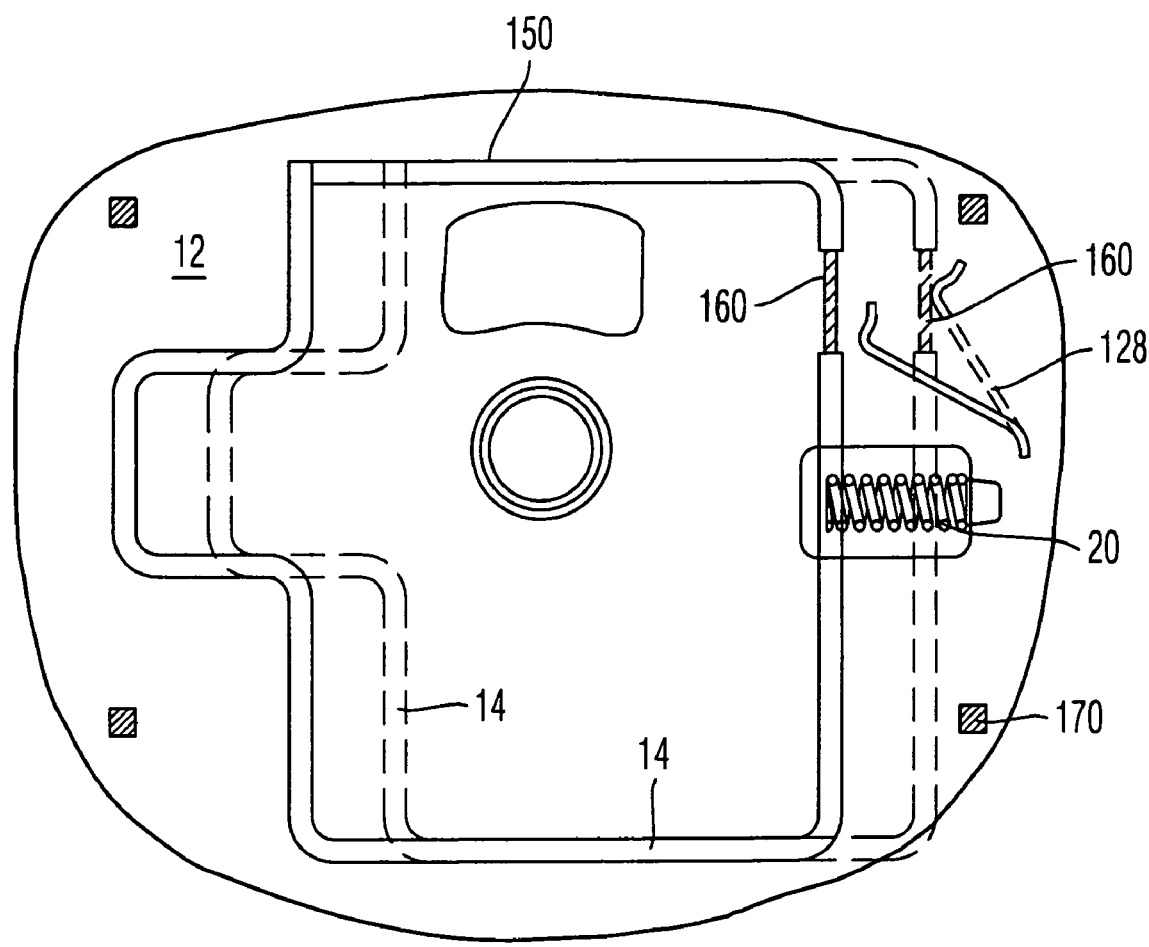
FIG. 7 shows a diagrammatic top view onto components of a monitoring system according to the invention.

In FIG. 7 a cutout of a monitoring system is shown, in which the first detent element 14 is connected with the positive pole of the battery 34. In this case, a majority of the first detent element 14 is surrounded by an electrical insulation 150; the metal of the first detent element 14 only lies free on a small section 160. In this region, the second contact element 128 is arranged such that in the deflected state of the first detent element 14, i.e. when the detent connection 14, 16 is not correctly locked (shown in dashed lines), it comes in contact with the section 160, so that an electrical contact is formed between the contact element 128 and the first detent element 14. In the correctly locked position, the first detent element 14 is situated again in its non-deflected position (shown in solid lines), in which the section 160 is spaced apart from the second contact element 128.

This form of the switch can be used in either of the proposed embodiments.

FIG. 7 also shows contact rivets 170 arranged on the vehicle-fixed part 13, which on actuation of the horn by pressing down the inserted gas bag module 10 bring about a ground contact between the module base or a contact element connected to ground, and also via the steering wheel 12 with the vehicle.

The features of the first and second embodiment can also be combined with each other at the discretion of a specialist in the art, or can be exchanged for each other.

The developments of the signal circuit which are shown, and also the type and arrangement of the contact elements, are merely considered to be examples for clarification of the idea of the invention of using an electric circuit to identify an incorrectly closed detent connection. The incorrectly locked detent connection can be indicated here both by the triggering of a signal and also by the impossibility of triggering a signal. The vehicle-fixed component does not necessarily have to be a steering wheel, but rather can also designate other components in the vehicle which are able to receive a gas bag module.

The invention claimed is:

1. A monitoring system in a motor vehicle, for detecting an incorrectly locked detent connection between a gas bag module (10) and a vehicle-fixed component comprising:
   first and second detent elements (14, 16) complementary to each other, said first detent element (14) being arranged on said vehicle-fixed component, said second detent element (16) being secured to said gas bag module (10);
   a signal circuit (24) including a switch (30), said switch (30) having first and second contact elements (26, 28) said signal circuit (24) generating, a monitoring warning signal indicating an incorrectly locked detent connection when said switch (30) is closed and
   said contact elements (26, 28) being in electrical contact with each other and said switch (30) being closed to provide the monitoring warning signal only when said first and second detent elements (14, 16) are incorrectly locked.

2. A monitoring system in a motor vehicle, for detecting an incorrectly locked detent connection between a gas bag module (10) and a vehicle-fixed component,
   comprising first and second detent elements (14, 16) complementary to each other,
   wherein a signal circuit (24) is provided, having first and second contact elements (26, 28) which are part of a switch (30) arranged in said signal circuit (24), a monitoring signal being generated when said switch (30) is closed and
   said contact elemnts (26, 28) being in electrical contact with each other, with said switch (30) being closed in an incorrectly locked state of said first and second detent elements (14, 16) only, wherein said monitoring signal is an acoustic signal.

3. A monitoring system in a motor vehicle, for detecting an incorrectly locked detent connection between a gas module (10) and a vehicle-fixed component, comprising first and second detent elements (14, 16) complementary to each other, wherein a signal circuit (24) is provided, having first and second contact elements (26, 28) which are part of a switch (30) arranged in said signal circuit (24), a monitoring signal being generated when said switch (30) is closed and
   said contact elements (26, 28) being in electrical contact with each other, with said switch (30) being closed in an incorrectly locked state of said first and second detent elements (14, 16) only, wherein said signal circuit (24) is part of a horn circuit.

4. The monitoring system according to claim 1, wherein said signal circuit (24) is supplied by a battery (34) of said vehicle.

5. A monitoring system in a motor vehicle, for detecting an incorrectly locked detent connection between s gas bag module (10) and a vehicle-fixed component,
   comprising first and second elements (14, 16) complementary to each other,
   wherein a signal circuit (24) is provided, having first and second contact elements (26, 28) which are part of a switch (30) arranged in said signal circuit (24), a monitoring signal being generated when said switch (30) is closed and
   said contact elements (26, 28) being in electrical contact with each other, with said switch (30) being closed in an incorrectly locked state of said first and second detent elements (14, 16) only, wherein said first detent element (14) is a metal part fastened on one of said vehicle-fixed component and said gas bag module (10), said metal part being partially surrounded by an electrical insulation (150).

6. The monitoring system according to claim 1, wherein said second detent element (16) is formed by at least one detent hook fastened on one of said gas bag module (10) and said vehicle-fixed component.

7. The monitoring system according to claim 1, wherein said first contact element (26) is formed by said first detent element (14).

8. The monitoring system according to claim 1, wherein said first contact element is formed by a metal sheet fastened on one of said gas bag module (10) and said vehicle-fixed component (13).

9. A monitoring system in a motor vehicle, for detecting incorrectly locked detent connection between a gas bag module (10) and a vehicle-fixed component,
comprising first and second detent elements (14, 16) complementary to each other,
wherein a signal circuit (24) is provided, having first and second contact elements (26, 28) which are part of a switch (30) arranged in said signal circuit (24), a monitoring signal being generated when said switch (30) is closed and
said contact elements (26, 28) being in electrical contact with each other, with said switch (30) being closed in an incorrectly locked state of said first and second detent elements (14, 16) only, wherein said second contact element (28) is a metal sheet fastened on one of said gas bag module (10) and said vehicle-fixed component.

10. A monitoring system in a motor vehicle, for detecting an incorrectly locked detent connection between a gas bag module (10) and a vehicle-fixed component, comprising first and second detent elements (14, 16) complementary to each other, wherein a signal circuit (124) is provided, having first and second contact elements (126, 128) which are part of a first switch (130) arranged in said signal circuit (124), said signal circuit (124) comprising a second switch (36) which is open in a basic state and is connected in series with said first switch (130), said contact elements (126, 128) being in electrical contact with each other in a correctly locked state of said detent elements (14, 16) only, so that said first switch (130) is closed and said signal circuit (124) can be closed by closing said second switch (36).

11. The monitoring system according to claim 10, wherein said signal circuit (124) is part of a horn circuit and said second switch (36) is formed by horn contacts (128, 38).

12. The monitoring system according to claim 10, wherein said first contact element (126) is formed by a metal sheet fastened on one of said gas bag module (10) and said vehicle-fixed component.

13. The monitoring system according to claim 10, wherein said first contact element (126) is formed by said first detent element (14).

14. The monitoring system according to claim 10, wherein said first detent element (14) is a metal part fastened on one of said vehicle-fixed component and said gas bag module (10).

15. The monitoring system according to claim 10, wherein said second contact element (128) is a metal sheet fastened on one of said gas bag module (10) and said vehicle-fixed component.

16. The monitoring system according to claim 10, wherein said signal circuit (124) is supplied by a battery (34) of said vehicle.

17. The monitoring system according to the claim 1, wherein said monitoring signal is a visual signal.

* * * * *

UNITED STATES PATENT AND TRADEMARK OFFICE
CERTIFICATE OF CORRECTION

| | | |
|---|---|---|
| PATENT NO. | : 7,114,745 B2 | Page 1 of 1 |
| APPLICATION NO. | : 10/731671 | |
| DATED | : October 3, 2006 | |
| INVENTOR(S) | : Dominik Schutz | |

It is certified that error appears in the above-identified patent and that said Letters Patent is hereby corrected as shown below:

Column 6, line 27, after "gas" insert --bag--.
Column 6, line 43, before "gas" delete "s" and insert --a--.
Column 6, line 45, before "elements" insert --detent--.

Signed and Sealed this

Third Day of April, 2007

JON W. DUDAS
*Director of the United States Patent and Trademark Office*